June 3, 1930. G. B. GALLASCH 1,761,260
OPTICAL MEASURING INSTRUMENT
Filed Nov. 20, 1925 6 Sheets-Sheet 3

Inventor
George B. Gallasch
By Edward H. Cumpston
his Attorney

June 3, 1930.  G. B. GALLASCH  1,761,260
OPTICAL MEASURING INSTRUMENT
Filed Nov. 20, 1925  6 Sheets-Sheet 4

Inventor
George B. Gallasch
By Edward H. Cumpston
his Attorney

June 3, 1930.  G. B. GALLASCH  1,761,260
OPTICAL MEASURING INSTRUMENT
Filed Nov. 20, 1925    6 Sheets-Sheet 5
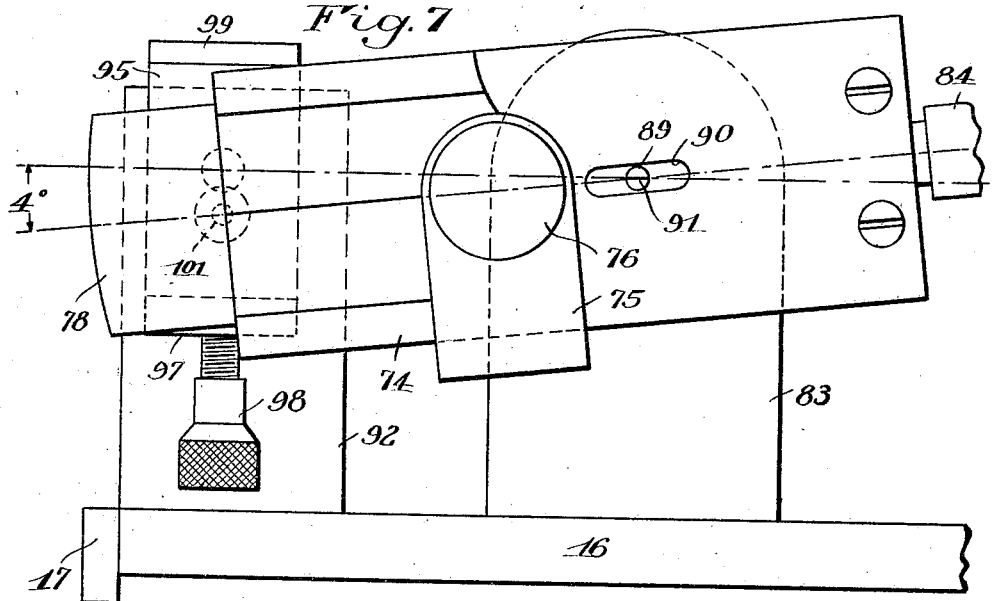
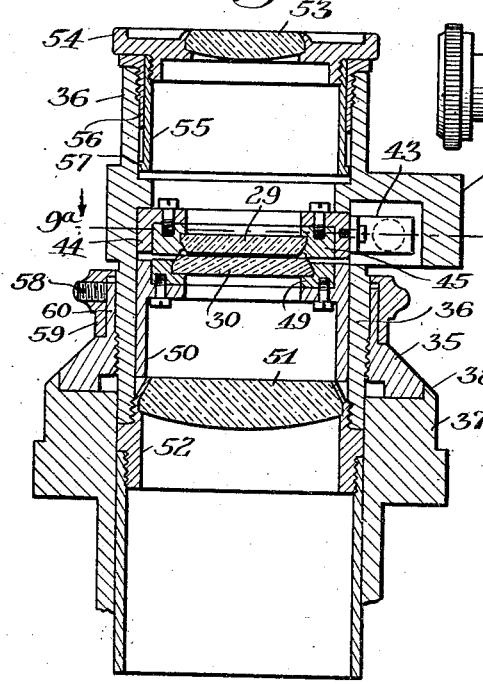
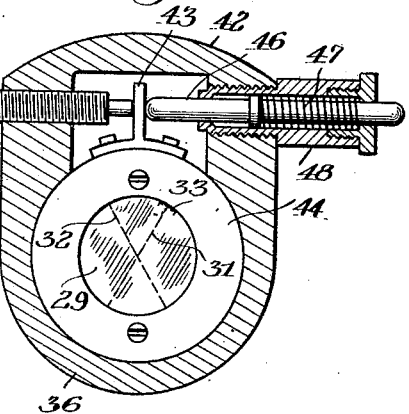
Inventor
George B. Gallasch
By Edward H. Cumpston
his Attorney

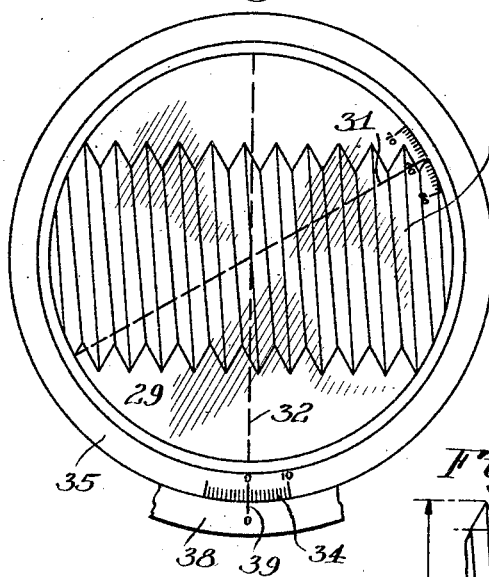
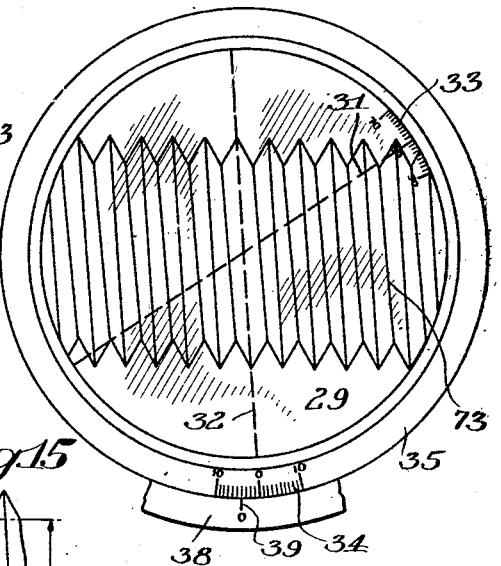
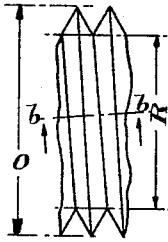
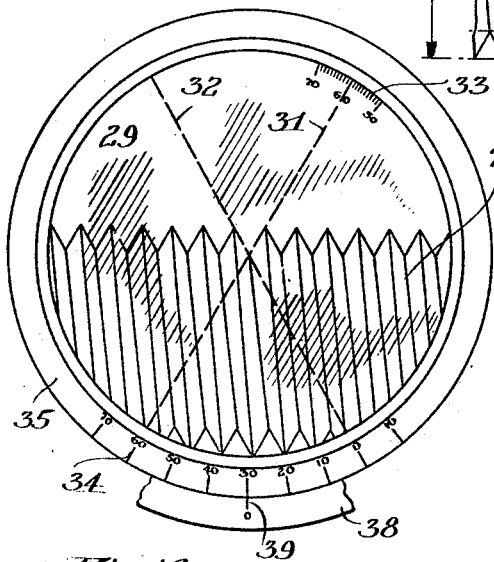
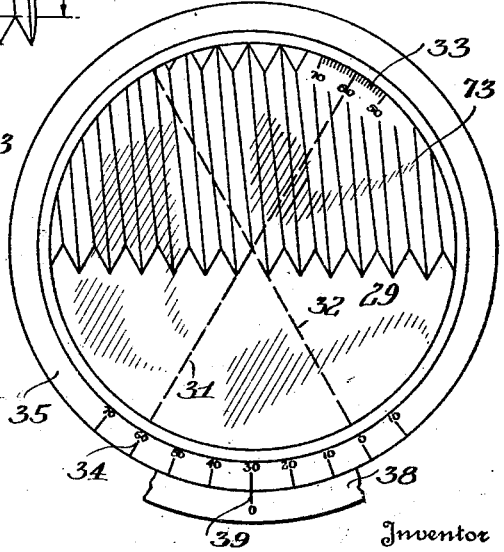
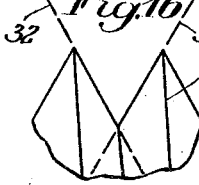
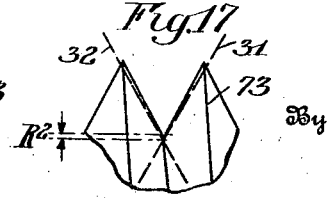

Patented June 3, 1930

1,761,260

UNITED STATES PATENT OFFICE

GEORGE B. GALLASCH, OF ROCHESTER, NEW YORK, ASSIGNOR TO BAUSCH AND LOMB OPTICAL COMPANY, OF ROCHESTER, NEW YORK, A CORPORATION OF NEW YORK

OPTICAL MEASURING INSTRUMENT

Application filed November 20, 1925. Serial No. 70,260.

The present invention has for its object to provide an improved optical measuring instrument adapted for visually inspecting and measuring various objects such as screw threads, gear teeth and other parts where it is desired to accurately determine certain measurements, such as the distances between different points, or the angular relation of one part of an object with respect to another.

A further object of the invention is to provide an improved, self-contained, extremely accurate optical measuring instrument constructed to afford a variety of measurements and one in which the parts are compactly arranged and conveniently disposed for use in making the desired study and measurements of the various objects to be examined.

To these and other ends the invention resides in certain improvements and combinations of parts, all as will be hereinafter more fully described, the novel features being pointed out in the claims at the end of the specification.

In the drawings:—

Figure 7 is a similar view showing the holder tilted in the opposite direction;

Figure 8 is an enlarged sectional elevation through the eyepiece shown in Figure 1;

Figure 9 is a horizontal section taken on line $9^a$—$9^a$ of Figure 8;

Figure 10 is a diagrammatic view illustrating the arrangement of the reflecting mirrors employed for illuminating the work at the point of inspection;

Figure 11 is a diagrammatic view showing the work as it appears in the eyepiece with the latter set at zero position;

Figure 12 is a similar view showing the correct reading for the helix angle of the screw when one of the measuring lines is coincident with the apex of one of the threads;

Figure 13 is a diagrammatic plan view showing the cross lines at an angle of 60° and in coincidence with the profile of one of the screw threads;

Figure 14 is a similar view showing a corresponding reading with the screw shifted to the opposite side of the field from that shown in Figure 13;

Figure 15 is a diagrammatic view in which the line $b$—$b$ indicates the right angle position at which the thread is viewed when the screw is tilted the amount of the mean helix angle;

Figure 1:
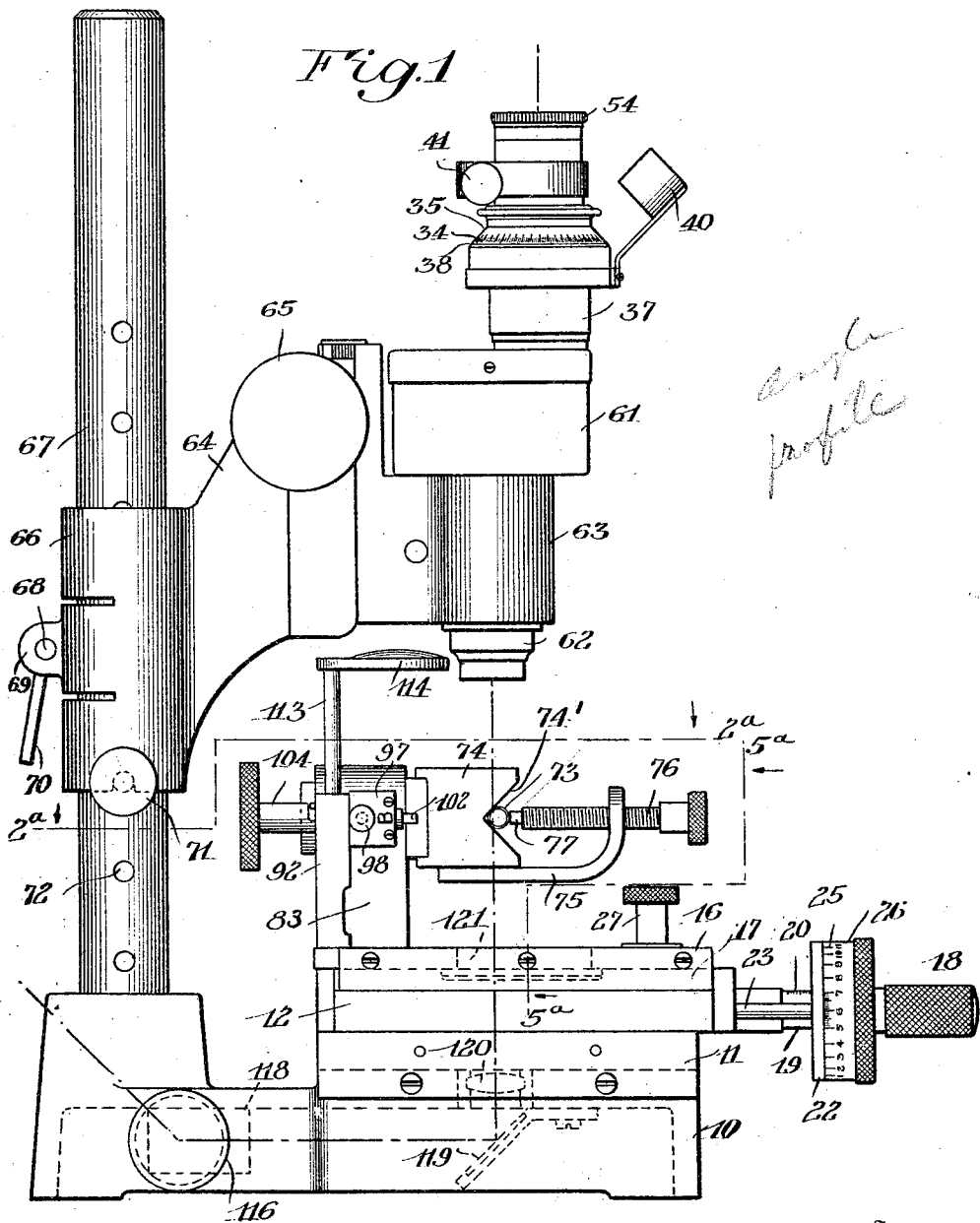
Figure 1 is a side elevation of a machine embodying one form of the invention.
Figure 2:
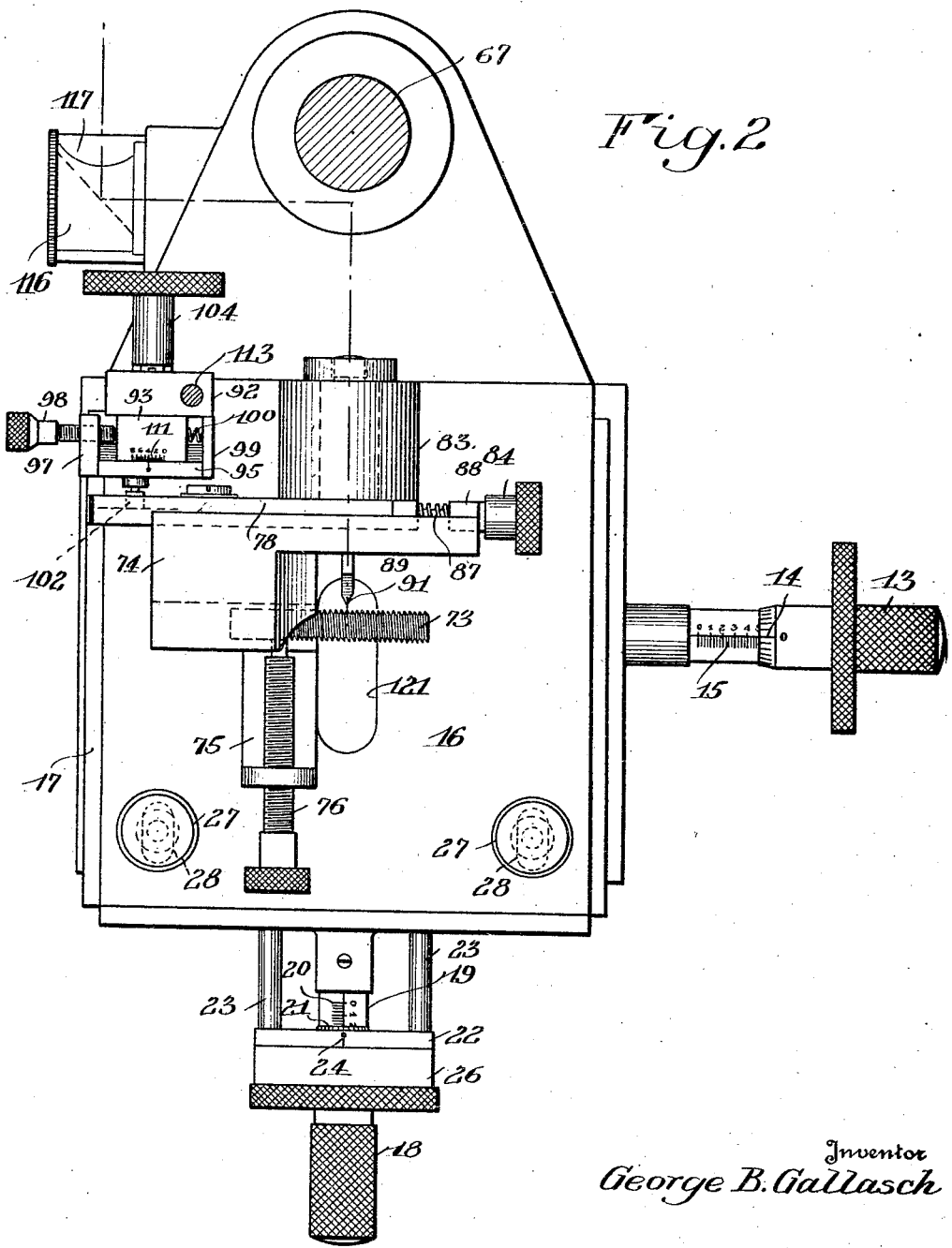
Figure 2 is a sectional plan taken on line $2^a$—$2^a$ of Figure 1.

Figure 16 is a diagrammatic view illustrating the cross lines of the eyepiece disposed at an angle of 60° and in coincidence with the profile of the thread before the screw is tilted, or when its axis is at a right angle to the line of sight, and Figure 17 is a similar view showing the result of tilting the screw the amount of the mean helix angle without varying the angle of the cross lines of the eyepiece.

Similar reference numerals throughout the several views indicate the same parts.

In the manufacture of screws or other threaded machine parts, as well as in the production of gears and such objects as have different forms of angular projections requiring extreme accuracy in their construction, it is essential that suitable means be provided for carefully inspecting and accurately measuring the same to determine their fitness for the purpose intended. The present invention is one designed particularly to fulfill the needs of an instrument of this kind and its value will be apparent upon comparing the results to be obtained in its use over those afforded by the use of the various forms of gauges and measuring devices heretofore provided for similar purposes, which afford only approximate and therefore inadequate results.

The instrument as employed in the checking of screw threads and other parts embodies an optical system adapted to afford accurate measurements of the mean helix angle, the root and outside diameters and the proper profile or angle of the threads, as well as the determination of the pitch diameter and also to afford a careful inspection of the threads under magnification to locate any imperfections or irregularities which may be due to poor material or workmanship.

The invention embodies generally a work holding stage and a microscope for viewing various objects, the microscope including an adjustable angle measuring eyepiece having suitable markings, such as the dotted cross lines shown, adapted to be brought into coincidence either independently or jointly with the parts to be measured through the adjustments provided whereby to determine from one or more scales on the instrument the angular relationship of one part with respect to another, or the relation of a particular portion of an object to its longitudinal or other axis.

The invention also contemplates in certain instances, as in the measuring of screw threads, the use of the microscope to determine the mean helix angle of the thread in order to arrive at the angle through which the work holder must be tilted to position the screw so that the line of sight will be perpendicular to or at a right angle to the thread whereby its correct profile may be determined as well as its root diameter.

Referring to the drawings, 10 represents a hollow frame or base having upstanding detachable supports 11 on which is mounted a microscope stage embodying a carriage 12 adapted to be reciprocated transversely of the base by a micrometer screw 13 having an index 14 for cooperation with a scale 15 whereby the desired adjustments of the carriage are afforded. The stage also includes a table 16 mounted upon the carriage and provided with gibs 17 at its opposite sides adapted to travel on ways formed on the carriage. The table is adapted to be reciprocated upon the carriage by a micrometer screw 18 operable through a fixed sleeve 19. The sleeve is provided with a scale 20 with which is adapted to cooperate an index 21 on a head 22 supported by arms 23 projecting within the carriage 12 and connected with the table 16 whereby upon turning the screw 18 the table will be reciprocated and likewise the head 22 upon the sleeve 19. The finer readings of the micrometer are afforded through cooperation of an index 24 on the head 22 and a circular scale 25 on the drum 26 adapted to turn with the screw 18 which is of course adapted for moving the table forwardly and rearwardly of the machine to move the object to be measured into the center of the field of the eyepiece. One revolution of the screw is equal to .025" and since the drum 25 is graduated into 250 divisions a value as small as .0001" can be indicated with certainty. In cases where is it necessary to move the stage to the right or left this is done by turning the micrometer screw 13 at the right of the instrument which is adapted to afford an extremely fine adjustment.

The table 16 is also adjustable upon the carriage 12 independently of its movement by means of the micrometer screw 18. This is permitted upon loosening the screws 27 which are threaded into the carriage through slots 28 in the table. With this arrangement the micrometer at the front of the machine may be set at the zero position and the table shifted manually to bring the starting point of the work in the center of the field, as viewed in the eyepiece, so that when reading the distance between two points on the object the exact reading may be taken from the micrometer without necessitating any deductions on the part of the operator which would be required if starting from a point other than the zero point of the instrument.

The work holder carried by the table 16 may be of any suitable design depending upon the character of the work to be measured. However, for use in the measurement of screw threads I have provided a new and novel design for holding and tilting the screw so that it may be shifted from a horizontal or other predetermined position to move its axis out of a plane at a right angle to the axis of the objective an amount equal to the mean helix angle of the thread, whereby the line of sight will be at a right angle to the profile of the thread which would not be the case if the axis of the screw remained at a right angle to the line of sight. An incorrect reading would be afforded under such conditions, both as regards to the angle of the thread and the root diameter thereof.

Before describing the adjustable or tiltable work holder I will give an outline of the construction of the micrometer eyepiece for determining the different measurements of the screw threads or other parts to be measured. The field of the eyepiece embodies upper and lower relatively movable ground glass or translucent members 29 and 30, respectively, Figures 8 and 9 the lower of which is preferably fixed while the upper is adapted to be rotated by means which will be hereinafter described. The adjustable glass 29 carries a line or mark 31 intersecting its center while the fixed glass 30 carries a similar line 32 intersecting its center, the intersection of the two lines being on the axis of the eyepiece. The fixed glass is provided adjacent its periphery with a scale 33 graduated in degrees, the range being preferably from 50° to 70°, as shown in Figures 13 and 14. It will be apparent that upon rotating the glass 29 to bring the line 31 in coincidence with any of those of the scale 33 that the angle between the lines 31 and 32 can be read from the scale. Furthermore the line 32 on the fixed glass coincides with the zero point of a circular scale 34 Figure 1 on the eyepiece ring 35 which is rigid on the lens tube or barrel 36 and rotatable therewith in a sleeve 37 which carries an upstanding beveled ring-shaped portion 38 having an index 39 thereon. A small magnifying eyepiece 40 is attached to the sleeve as shown in Figure 1 to overlie the index 39 and scale 34 whereby the relatively fine graduations of the latter may be read with ease.

Rotation of the glass 29 carrying the line 31 is effected by a thumb screw 41 threaded in a recessed lateral extension 42 of the lens barrel 36 and having its inner end engaging an arm 43 within the extension, the arm being connected with and adapted to rotate a flanged ring 44 journaled within the barrel. A detachable holder 45 for the glass 29 is disposed within the ring 44 as shown in Figure 8. A plunger 46 engages the opposite side of the arm 43 from that engaged by the operating screw 41, the plunger being actuated by a spring 47 in a casing 48 detachably connected with the extension 42, as shown in Figure 9. The spring pressed plunger serves to rotate the glass within the limits of the scale 33 so that the angle between the lines 31 and 32 may be varied and readily determined by the operator.

The glass 30 is mounted in close proximity to the glass 29 and is carried by a detachable holder 49 connected with a ring-shaped member 50 fixed in any suitable manner within the lens tube or barrel 36. A suitable collecting lens 51 carried by a holder 52 is disposed within the eyepiece below the field, as shown in Figure 8. A magnifying lens 53 is disposed in a suitable holder 54 at the outer end of the eyepiece, the holder being threaded in a sleeve 55 adjustable longitudinally within the lens barrel to provide for the focusing of the eyepiece, the sleeve being limited in its outward movement by a ring 56 through engagement of the latter with an annular shoulder 57 on the sleeve. The scale ring 35 is locked in adjusted position upon the lens barrel by any suitable means, such as a screw 58 threaded through a ring 59 surrounding a split collar 60 on the upper end of the scale ring whereby the latter is clamped upon the lens barrel.

The sleeve 37 for supporting the eyepiece is superimposed upon a suitable erecting system enclosed within a casing 61 mounted on objective 62 carried by a holder 63 slidably mounted for vertical movement upon a bracket 64 held in the desired position of adjustment by a thumb screw 65 operatively connected with the holder through a rack and pinion, not shown. The bracket 64 includes a split sleeve 66 adapted to be clamped upon a post 67 by a screw 68 operable in a pair of lugs 69 on the bracket, the screw being preferably actuated by a handle 70 shown in Figure 1. The bracket is adjustable upon the posts to roughly adjust the microscope with respect to the work and is adapted to be positively held in the desired position by a pin 71 insertable in any of a number of holes 72 formed in the post.

Further adjustment of the microscope to bring it to the desired point is of course afforded by turning the thumb screw 65 while focusing of the eyepiece is afforded through longitudinal adjustment of the lens holder 54 and sleeve 55.

Figure 3:
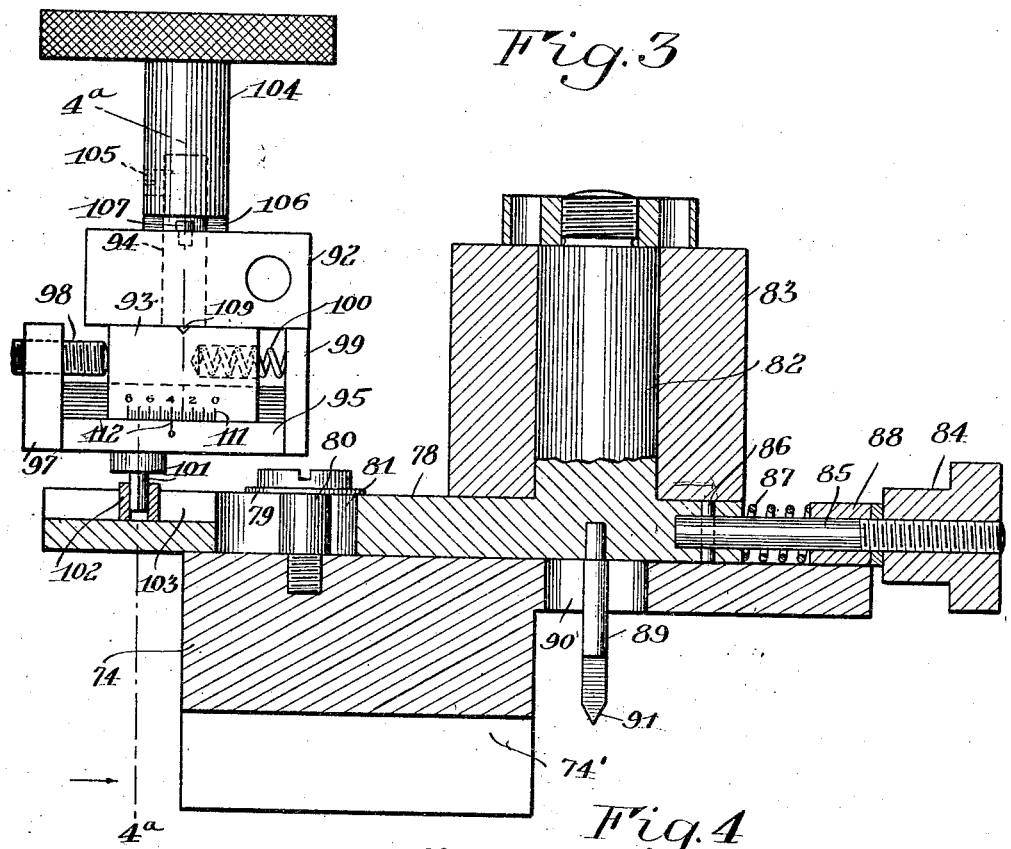
Figure 3 is an enlarged horizontal sectional view through the tiltable work holding arm taken on line $3^a$—$3^a$ of Figure 5.

The work, comprising in the present instance a screw, is indicated at 73, being preferably disposed within a V-shaped holder 74 to which is secured an arm 75 carrying a thumb screw 76 provided with a detachable work engaging member 77 formed of relatively soft material so as not to injure the threads of the screw to be measured. The V-shaped holder is adapted to receive different size work pieces, all of which become centered in the holder on a common axis in a plane extending transversely to the optical axis of the objective 62, a relatively large piece being indicated by the dotted line 73' in Figure 4. The holder 74 is mounted for longitudinal adjustment on a tiltable arm or bracket 78 and is yieldingly held in frictional engagement therewith by a spring washer 79 secured by a screw 80 extending through a slot 81 in the arm and forming a support for the holder, the screw being threaded into the holder as shown in Figure 3. The arm 78 is provided with a lateral extension 82 pivotally disposed within a post or bearing member 83 extending upwardly from the table 16. The holder 74 may be adjusted upon the pivotal arm by loosening or tightening a thumb nut 84 on a bolt 85 rigidly connected with the tiltable arm by a pin 86. A spring 87 carried by the bolt is interposed between the arm and a lug 88 rigid upon the holder 74, the spring acting to move the holder to the right as viewed in Figure 3 upon loosening the thumb nut 84.

Figure 4:
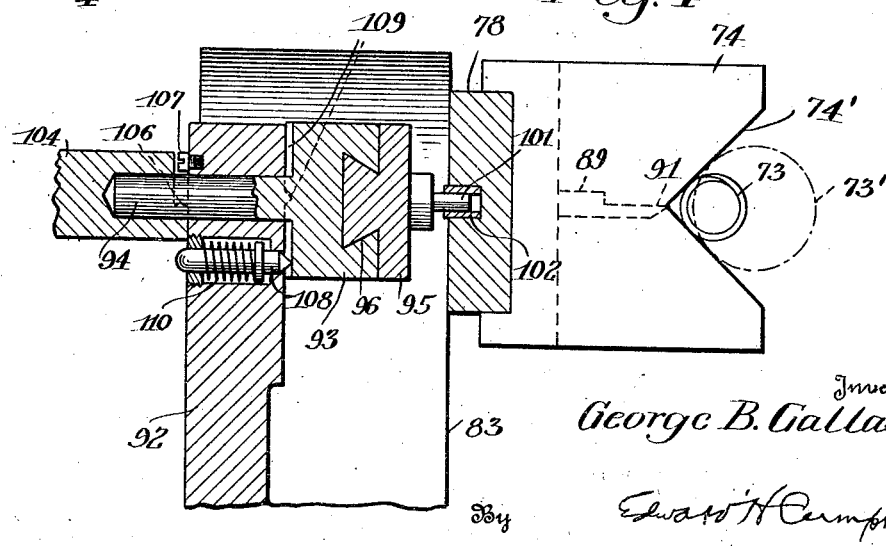
Figure 4 is a fragmentary sectional elevation taken on line $4^a$—$4^a$ of Figure 3.
Figure 5:
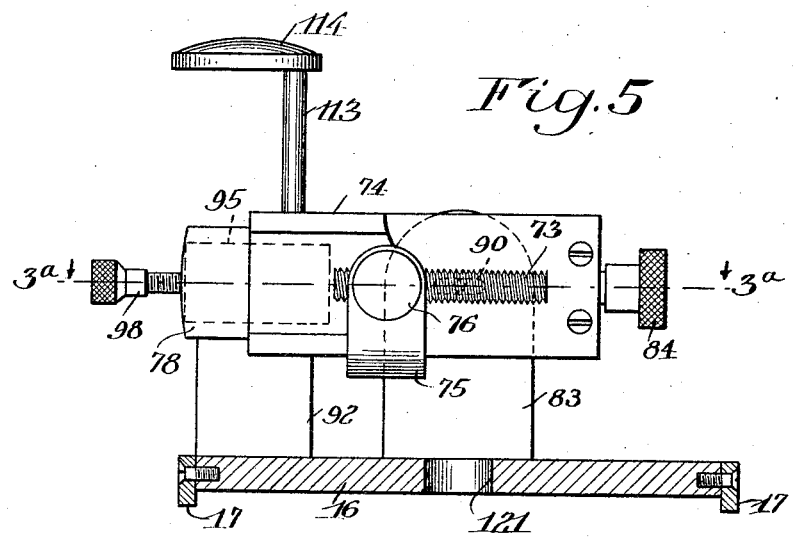
Figure 5 is a sectional elevation taken on line $5^a$—$5^a$ of Figure 1.

The tiltable arm 78 is provided, on its pivotal axis, with a pin 89 projecting through a slot 90 in the holder 74, the pin being flattened at its free end and pointed, as indicated at 91, to constitute a fixed object at a definite point upon which to focus the microscope. The flattened surface of the pointer is preferably disposed within a plane intersecting the angle of the V 74' or the horizontal axis of the screw 73, as indicated in Figure 4, whereby upon focusing upon the pointer and bringing the cross lines of the field of the eyepiece into coincidence with the profile of the thread, as indicated in Figure 16, a sharp focus will be assured since the profile of the thread is in a plane corresponding to the plane of the flattened surface of the pointer. It will be seen therefore that the axes of all cylinders disposed within the V of the holder will lie in a plane coincident with the upper surface of the pointer 91, as well as in a plane coincident with the pivotal axis of the arm 78.

The means for tilting the work holder the exact amount desired, or that corresponding to the mean helix angle of the thread to be measured, comprises a support or bracket 92, Figures 1, 3 and 4 projecting upwardly from the microscope table 16 and carrying at its upper end a block 93 rigid on a pivot pin 94 journaled in the support 92 as shown in Figure 4. The block carries a slide 95 movable upon ways 96 thereon. The slide at one end carries a lateral extension 97 through which is threaded an operating screw 98 for moving the slide in one direction on the block. The slide is provided at its opposite end with a lateral extension 99 between which and the block is interposed a spring 100 for moving the slide to the right, as viewed in Figure 3, upon loosening the thumb screw 98. The slide carries at its forward edge a pin 101 loosely projecting into a bearing block 102 adapted to slide in a slot 103 formed in the rear side of the tiltable arm 78. The block 93 and the slide thereon are adapted to be rotated through an angle of 180° or between the extreme positions shown in Figures 6 and 7. This is effected by means of an operating handle 104 which is recessed to receive the outer end of the pivot pin 94, the handle being rigidly connected with the pin by a set screw 105, Figure 3. The handle is notched at 106 to form shoulders which cooperate with a stop pin 107 on the support 92 whereby to limit rotation of the block through the desired angle of 180°. Normally the block is held in a horizontal position by the projection of a beveled plunger 108 in one of a series of grooves 109 formed in the block at right angles to each other. The plunger 108 is thus adapted to hold the block against accidental displacement from its different positions of adjustment. The plunger is actuated by a spring 110 surrounding it, as shown in Figure 4. The block 93 is provided with a scale 111 and the slide 95 with an index 112, by which to regulate the degree of tilt of the arm 78. When the index is in registry with the zero point of the scale the axis of pin 101 will coincide with the axis of the pivot pin 94 of the block 93 and the arm will be held at a right angle to the line of sight regardless of the angular position of the block. In this position the tilting means may stand adjusted while focusing upon the pointer 91, although movement of the slide 95 to some other than the zero point upon the block does not vary the position of the arm 78 unless the handle 104 is rotated out of the normal position shown in Figure 3. It will be apparent that any movement of the slide 95 to move the index 112 out of registry with the zero point of the scale 111 will result in shifting the pin 101 and the bearing block 102 within the slot of the pivoted arm and if the block 93 is subsequently rotated about its pivotal axis the arm will be tilted to the desired angle. The angle of the tilt is of course determined by moving the index 112, the number of degrees desired on the scale 111, for example, 4° as indicated in Figure 3, which corresponds in the present instance to the angular positions of the arm shown in Figures 6 and 7. It will be understood of course that this represents the mean helix angle of the screw, as determined by moving the line 32 from the zero or right angle position with respect to the axis of the screw to the 4° position shown in Figure 12, at which the line coincides with the apex of the thread, the reading being taken from the scale 34 on the eyepiece ring 35.

By mounting the work holder so that it can be tilted in opposite directions, both right and left-hand screws can be brought to the desired angle with respect to the optical axis of the microscope objective. For convenience in determining in which direction to move the tilting devce for right and left hand screws I have marked the end members 99 and 97 of the slide 95 with the letters A and B, respectively, the latter being shown in Figure 1 and the former not indicated. For right hand screws the letter A will be on top, as when the device is tilted to the position shown in Figure 7, while for left hand screws the letter B will be on top with the parts in the position indicated in Figure 6.

A post 113 is rotatably disposed in the support 92 of the tilting device and provided at its upper end with a magnifying glass 114 adjustable over the scale 111 whereby the latter may be more easily read by the operator.

A system of mirrors or reflectors is provided in the base of the instrument for reflecting light upon the work from beneath the microscope, the arrangement of the same being best indicated in Figures 1 and 10. The light intercepting mirror 115 is mounted in a holder 116 rotatably disposed in the side wall of the base, the holder having a light receiving opening 117, the position of which may be varied by rotating the holder whereby the light may be intercepted from various angles. The mirror 115 is adapted to project the light to a mirror 118 in the hollow base, from which it is projected to a mirror 119, which in turn directs the light upwardly thru a collecting lens 120 and thru an elongated opening 121 in the table 16, located directly in line with the optical axis of the objective 62.

In the examination of threads with the line of sight at a right angle to the axis of the screw the true profile of the thread is not apparent since it is not observed at a right angle due to the thread being inclined with respect to the optical axis of the microscope to the extent of the mean helix angle. In a reading of this kind, as illustrated in Figure 16, with the axis of the screw at a right angle to the line of sight, the angle between the flanks of the adjacent threads is greater than that seen when observing the threads at a right angle as indicated by the lines b—b in Figure 15. The angle observed in Figure 16 with the axis of the screw at a right angle to the line of sight will necessarily become smaller upon tilting the screw to view the profile of the thread at a right angle, an example of which is illustrated in Figure 17 where the angle between the lines 31 and 32 is the same as indicated in Figure 16, but with the angle between the threads less. When sighting the screw at a right angle to its axis the curvature of the threads must be considered since the effect is to cause a false reading of the true profile of the thread, which can only be found when viewing it at a right angle as when the screw is tilted the amount of the mean helix angle of the thread. Furthermore, the tilting is also necessary in order to find the correct root diameter, which appears greater before tilting the screw than after. An example of half the difference between the root diameter of a tilted and non-tilted screw is indicated by the distance $R^2$ in Figure 17.

Figure 6:
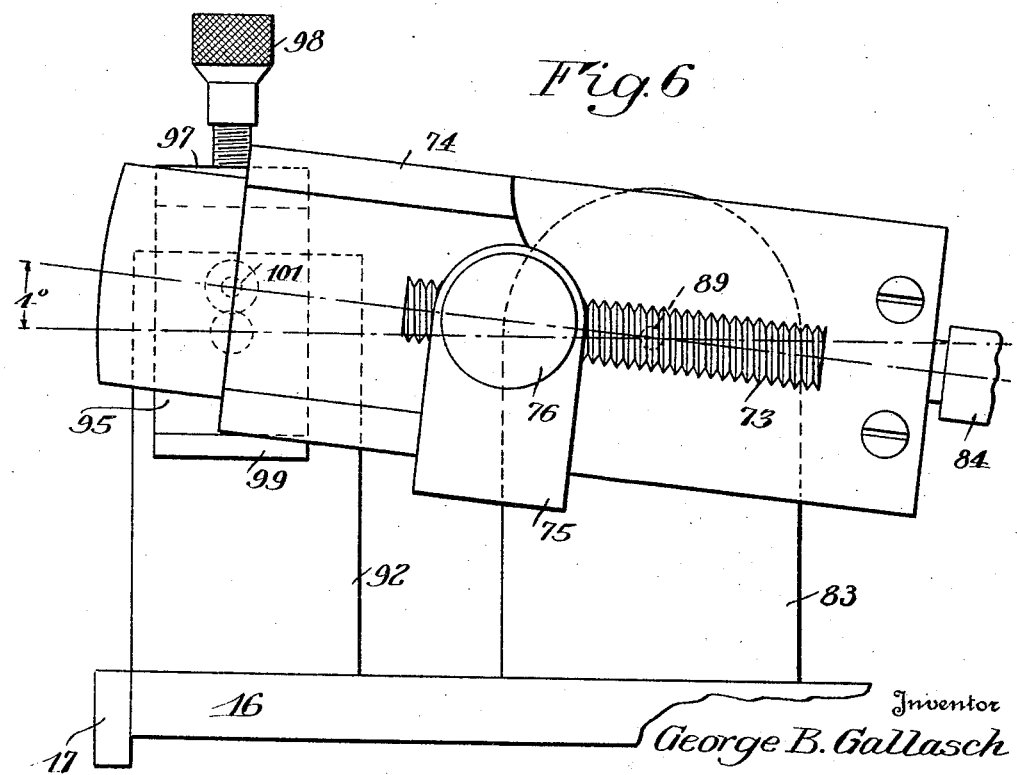
Figure 6 is an enlarged fragmentary elevational view showing the work holder in one of its tilted positions.

The operation of the instrument, in determining various measurements of screw threads, embodies first, clamping the screw in the V-shaped holder, as indicated in Figure 1, with the axis of the screw at a right angle to the optical axis of the objective 62. The microscope is then carefully focused on the top of the screw with the latter appearing in the field of the eyepiece in the position indicated in Figure 11. The eyepiece is then rotated from the zero position shown in Figure 11 to that shown in Figure 12 until the line 32 coincides with the apex of the particular thread chosen for measurement. The helix angle for the outside diameter is then read from the scale 34, being in the present instance 3°—55'. The object screw is then shifted one-half of the amount of the pitch of the thread to the right or left of the particular thread to be measured. The eyepiece is then shifted slightly to bring the line 32 into coincidence with the root of the thread and the helix angle of the root diameter is then read from the scale 34, being in the present instance 4°—5'. The two helix angles thus determined are added and the sum divided by two which will give a mean helix angle of 4°. By means of the coordinating micrometer screws of the instrument, the stage is adjusted to bring the pointer 91 into the center of the field of the microscope and the instrument is then carefully focused upon the same whereby a basis is afforded for the several measurements to be taken. The next step is to set the slide 95 to read 4° on the scale 111 of the tilting device. With this done the handle 104 is rotated a quarter of a turn to bring the tilting device to the A position, as indicated in Figure 7, if measuring a right hand screw and to the B position, as indicated in Figure 6, if measuring a left hand screw. The arm 78 will thus be operated to the position at which it will tilt the screw the amount of the mean helix angle, or 4° in the present instance. The threads may then be viewed at a right angle, as indicated by the line b—b in Figure 15. Preceding the actual measurement the microscope stage is shifted by means of the front micrometer screw 18 until that portion of the object to be measured appears in the center of the field of the eyepiece. Should the adjustment require also a shift to the right or left this is done with the relativetly fine motion screw 84. If it is assumed that the angle of the thread is 60° the scale of the eyepiece is set so that the 30° point on the scale plate 35 will coincide with the index 39 on the fixed ring 38, with the line 31 set to coincide with the 60° position on the scale 33 carried by the lower or fixed glass 30. The lines 31 and 32 should then coincide with the angle of the thread to be measured, an example of such coincidence being shown in Figure 13. If the lines 31 and 32 do not coincide with the profile of the thread they may be adjusted until coincidence is established, after which the angle of the thread may be read from the scale 33. Furthermore, if the angle between the flanks of the thread is unknown to start with, it may be readily found by bringing the line 32 into coincidence with one side of the thread and reading from the scale 34 and the line 31 into coincidence with the adjacent side of the opposite thread as indicated in Figure 13 and reading from the scale 33. If it is desired to measure the angle of the thread at the opposite side of the screw as indicated in Figure 14, the screw is tilted to the position indicated in Figure 6 and shifted to the right or left an amount equal to half the pitch of the thread and then moved rearwardly across the field and the lines 31 and 32 brought into coincidence with the thread profile by following the same operation as that described above. The procedure is the same for a left hand screw as for a right hand screw except that in the case of the former the tilting operations are reversed.

Where it is desired to measure the root diameter, the mean helix angle is found as described above and the arm 78 tilted accordingly. The screw is then moved until the intersection of the lines 31 and 32 coincides with the profile of the thread as indicated in Figure 13. The position of the scale of the micrometer screw 18 is then noted and the screw 73 shifted across the field to the position indicated in Figure 14, after having given the handle 104 of the tilting device half a turn to reverse the position of the arm 78. The difference in the two readings will equal the root diameter of the screw being measured. If the micrometer screw 18 is adjusted to the zero position and in this position the cross lines 31 and 32 are made to coincide with the profile of the thread, by loosening the screws 27 and shifting the table 16 as described above, the correct reading for the root diameter may be taken directly from the micrometer scale, after properly tilting the screw and moving it across the field to the position shown in Figure 14. Having found the root diameter the thread constant for finding the pitch diameter may be added for obtaining the latter. On the other hand if the theoretical outside diameter is first found the constant for finding the pitch diameter will have to be deducted.

The theoretical outside diameter may be readily found by shifting the screw across the field and reading from the scale of the micrometer screw 18 the distance O as indicated in Figure 15.

Where it is desired to find the pitch diameter of a screw, such as one having nonstandard threads of an unknown angle, the stage is adjusted by means of the micrometer screw 18 to position the screw 73 so that the intersection of the cross lines in the eyepiece will coincide with the intersection of the flanks of a thread at one side of the screw. The reading of the micrometer is then recorded and the screw shifted to the right or left an amount equal to half the pitch of the thread and then shifted from front to rear to the extent of the depth of the thread or until the intersection of the cross lines coincide with the point of intersection of the flanks of two adjacent threads, after which the reading of the micrometer is again recorded. The screw is then tilted in the opposite direction and again shifted transversely half the pitch of the thread. It is then moved rearwardly across the field the extent of the root diameter and the reading for this measurement recorded, after which it is again shifted rearwardly the necessary amount to to complete the reading of the theoretical outside diameter. Having thus obtained the root diameter and the theoretical outside diameter these are added and the sum divided by two to obtain the pitch diameter.

It will be understood that the screw threads shown in Figures 11 to 14 inclusive are in conventional form and that the cross line 32 will not coincide with the apex of the thread for the full diameter of the screw, as shown in Figure 12, due to the curvature of the threads. However, the extent of coincidence at the center of the screw will be sufficient to permit the mean helix angle to be readily determined. Furthermore, this angle may be determined by adjusting the cross line 32 into coincidence with the base of the thread if desired, or with some other portion of the thread.

I claim as my invention:

1. In an optical measuring instrument, the combination of a base, a screw holder mounted for a tilting movement thereon, a microscope mounted upon the base and including an angle measuring eyepiece by which the mean helix angle of the screw thread may be determined and adjustable tilting means associated with the screw holder adapted to permit the holder to be tilted relative to a plane perpendicular to the optical axis of the microscope objective through an amount corresponding to said helix angle.

2. In an optical measuring instrument, the combination of a base, a screw holder mounted for a tilting movement thereon in opposite directions from a predetermined position, an angle measuring microscope mounted upon the base for measuring the mean helix angle of the screw threads when the holder is in said predetermined position, and adjustable tilting means for moving the holder the extent of the helix angle on either side of said position including indicating means by which to determine the extent of adjustment.

3. In an optical measuring instrument, the combination of a base, an angle measuring microscope mounted thereon, a microscope stage adjustable upon the base, a screw holder mounted for a tilting movement upon the stage adapted to normally hold the screw with its axis at a right angle to the optical axis of the microscope, and adjustable means for regulating the tilt of the holder adapted to be set for an angle corresponding to the mean helix angle of the screw thread and movable thereafter to position the screw thread at a right angle to the optical axis of the microscope.

4. In an optical measuring instrument, the combination of a base, a tiltable screw holder mounted thereon, an angle measuring microscope mounted upon the base for measuring the mean helix angle of the screw threads, means for bodily shifting the holder independently of the tilting movement, and adjustable means for regulating the degree of tilt adapted to be set for an angle corresponding to said helix angle.

5. In an optical measuring instrument, the combination of a base, an angle measuring microscope mounted thereon for measuring the mean helix angle of a screw, a microscope stage adjustable upon the base, a screw holder mounted for a sliding and tilting movement upon the stage, means for sliding the holder independently of the tilting movement, and tilting means for the holder adapted to be adjusted to afford an angle of tilt relative to a plane perpendicular to the optical axis of the microscope objective corresponding to the means helix angle of the screw to be measured.

6. In an optical measuring instrument, the combination of a base, an angle measuring microscope mounted thereon for measuring the mean helix angle of a screw, a microscope stage adjustable upon the base, a screw holder mounted for a sliding and tilting movement upon the stage, means for sliding the holder independently of the tilting movement, and tilting means for the holder adapted to be adjusted to afford an angle of tilt relative to a plane perpendicular to the optical axis of the microscope objective corresponding to the mean helix angle of the screw to be measured and a combined stage adjusting and indicating device for determining the root or theoretical outside diameter of the screw.

7. In an optical measuring instrument, the combination of a base, an angle measuring microscope mounted thereon for measuring the mean helix angle of a screw, a device mounted for a tilting movement upon the base including a screw holder, operating means for said device adjustable to vary the degree of tilt, indicating means associated with said operating means to regulate the position of the latter previous to tilting and means for limiting the movement of said operating means.

8. In an optical measuring instrument, the combination of a base, a micrometer microscope mounted thereon, an adjustable stage carried by the base, an arm mounted to swing upon the stage and provided with a holder adjustable longitudinally of the arm for supporting a work piece in a plane intersecting the optical axis of the microscope, and a device for tilting the arm, said device being adjustable to vary the degree of tilt imparted to said arm by a predetermined movement of said device.

9. In an optical measuring instrument, the combination of a base, a micrometer microscope mounted thereon, an adjustable stage carried by the base, an arm pivoted to swing upon the stage and provided with a holder for supporting a work piece in a plane intersecting the optical axis of the microscope, and tilting means for the arm including a pivoted member having an adjustable part for engaging the arm at different distances from its pivotal axis whereby to vary its throw.

10. In an optical measuring instrument, the combination of a base, a micrometer microscope mounted thereon, an adjustable stage carried by the base, an arm pivoted to swing upon the stage and provided with a holder for supporting a work piece in a plane intersecting the optical axis of the microscope, and tilting means for the arm including a pivoted member having an adjustable part for engaging the arm at different distances from its pivotal axis whereby to vary its throw and indicating means for determining the extent of adjustment of said part.

11. In an optical measuring instrument, the combination of a base, a micrometer microscope mounted upon the base, a stage adjustable upon the base, a member pivotally mounted to swing upon the stage, a work holder adjustable upon said member adapted to shift the work transversely of the optical axis of the microscope, a slide operatively associated with said member and adapted to engage the latter at various distances from its pivotal swinging movement, and means pivotally axis whereby to regulate the extent of its swinging movement, and means pivotally supporting the slide to permit it to swing relative to said member.

12. In an optical measuring instrument, the combination of a base, a micrometer microscope mounted upon the base, a support adjustable upon the base, an arm mounted to swing upon the support, a work holder adjustable upon the arm to shift the work transversely of the optical axis of the microscope, a device adjustable to engage the arm at various distances from its pivotal axis whereby to vary the throw of the arm, and a pivoted support for said device adapted to swing through a predetermined arc to effect a swinging movement of the arm.

13. In an optical measuring instrument, the combination of a base, a micrometer microscope mounted upon the base, a support adjustable upon the base transversely of the optical axis of the microscope, an arm pivoted to swing upon the support, a work holder upon the arm, and pivotally disposed operating means for the arm including relatively adjustable parts, one of which is adapted to engage the arm at various distances from its pivotal axis whereby to vary its throw.

14. In an optical measuring instrument, the combination of a base, a micrometer microscope mounted upon the base, a bearing adjustable upon the base, a work holder pivotally disposed in the bearing, means adjustable to engage the holder at different distances from the pivotal axis whereby to vary the extent of movement of the work holder, and a support for the last mentioned means adapted to limit its movement in opposite directions.

15. In an optical measuring instrument, the combination of a base, a micrometer microscope mounted upon the base, a bearing adjustable upon the base, a work holder pivotally disposed in the bearing, means adjustable to engage the holder at different distances from the pivotal axis whereby to vary the extent of movement of the work holder, a support for the last mentioned means adapted to limit its movement in opposite directions, and means carried by the support for holding the last mentioned means in different positions of adjustment.

16. In an optical measuring instrument, the combination of a base, a micrometer microscope mounted upon the base, a bearing adjustable upon the base, an arm pivotally disposed upon the bearing, a work holder disposed upon the arm, a member slidably engaging the arm, a slide having a pin pivotally disposed within said member and a pivotal support for the slide adapted to be swung between predetermined points whereby to swing the arm in opposite directions upon its bearing.

17. In an optical measuring instrument, the combination of a base, a micrometer microscope mounted upon the base, a bearing adjustable upon the base, an arm pivotally disposed upon the bearing, a work holder disposed upon the arm, a bracket upon the base, a block pivoted to swing upon the bracket, a slide adjustable upon the block, a pin carried by the slide, a member slidably disposed upon the arm adapted to pivotally receive the pin, said block and slide having indicating means for determining the extent of adjustment of the slide, and means for limiting the swinging movement of the block.

18. In an optical measuring instrument, the combination of a base, a microscope mounted thereon, a stage adjustable upon the base, a work holding device pivotally disposed upon the stage, operating means therefor adjustable to vary the extent of the pivotal movement imparted to said device by a predetermined movement of said operating means, and a member carried by said device and adapted to afford means upon which to focus the microscope whereby to facilitate focusing upon the work.

19. In an optical measuring instrument, the combination of a base, a microscope mounted thereon, a stage adjustable upon the base, a work holding device pivotally disposed upon the stage, operating means therefor adjustable to vary the extent of the pivotal movement imparted to said device by a predetermined movement of said operating means, and a member disposed in a plane intersecting the pivotal axis of the work holding device and adapted to afford means upon which to focus the microscope whereby to facilitate focusing upon the work.

20. In an optical measuring instrument, the combination of a base, a microscope mounted thereon, a stage adjustable upon the base, a work holding device adjustable upon the stage and adapted to support the work in a plane extending transversely of the optical axis of the microscope, and a member disposed substantially in said plane and adapted to afford means upon which to focus the microscope whereby to facilitate focusing upon the work, said member having a portion remaining in fixed relationship to a part of said stage irrespective of the adjusting movements of said work support.

21. In an optical measuring instrument, the combination of a base, a microscope mounted thereon, a stage adjustable upon the base, an arm pivotally disposed upon the stage, a work holder carried by the arm and adjustable thereon and adapted to support a work piece in a plane intersecting the pivotal axis of the arm and a member projecting from the arm and fixed relative thereto and disposed substantially in said plane and adapted to afford means upon which to focus the microscope whereby to facilitate focusing upon the work.

22. In an optical measuring instrument, the combination of a base, a tiltable work holder thereon, a microscope mounted upon the base including an eyepiece having relatively adjustable field members provided with cooperating markings and with a scale to determine the angle between said markings, and means for adjusting the work holder whereby to position the work at predetermined angles with respect to a plane perpendicular to the optical axis of the microscope objective.

23. In an optical measuring instrument, the combination of a base, an adjustable work holder thereon, a microscope mounted upon the base including an eyepiece having relatively adjustable field members provided with markings adapted for alinement with different portions of a work piece viewed through the microscope, and having indicating means for reading the angle between said markings, and means for adjusting the work holder to tilt the work at different angles relative to a plane perpendicular to the microscope objective, said means including indicating means whereby to determine the extent of adjustment of the holder.

24. In an optical measuring instrument, the combination of a base, a work holder mounted to swing thereon, a microscope mounted upon the base and including a revoluble eyepiece having relatively adjustable field members provided each with a line adapted for movement in coincidence with different portions of a work piece carried by the holder and having indicating means for reading the angle between said lines, said eyepiece also having indicating means by which its angle of rotation is determined whereby to determine the extent of adjustment of one of the lines with respect to the work, and means for adjusting the work holder including indicating means for determining the angular relation of the work with respect to the optical axis of the microscope.

25. In an optical measuring instrument, the combination of a base, a microscope mounted thereon including an angle measuring eyepiece, a work holder mounted to swing upon the base on opposite sides of a plane at right angles to the optical axis of the microscope, and adjustable means adapted to maintain the holder in position to hold the work in said plane and at different angles with respect thereto including indicating means by which to determine the angular relation of the work with respect to said axis, said adjustable means including a part movable to a predetermined position to shift said holder to any of a plurality of angular positions with respect to said plane.

26. In an optical measuring instrument, the combination of a base, a microscope mounted thereon including an angle measuring eyepiece, and an adjustable holder pivotally mounted upon the base, the pivotal axis of said holder being transverse to the optical axis of the microscope objective, said holder having a V-shaped notch the axis of which substantially intersects said pivotal axis, said V-shaped notch being bisected by a plane passing through said pivotal axis so that said notch may support screws of different sizes with their axes in a common plane extending transversely to the optical axis of the microscope objective.

27. In an optical measuring instrument, the combination of a base, a microscope mounted thereon including an angle measuring eyepiece, an adjustable work holder pivotally mounted upon the base, the pivotal axis of said holder being transverse to the optical axis of the microscope, said holder having a V-shaped notch the axis of which intersects said pivotal axis, said V-shaped notch being bisected by a plane passing through said pivotal axis so that said notch may support screws of different sizes with their axes in a common plane extending transversely to the optical axis of the microscope objective, and a member associated with said holder and providing means upon which to focus the microscope to facilitate focusing thereof upon predetermined portions of screws held in said V-shaped notch.

28. In an optical measuring instrument, the combination of a base, a microscope mounted thereon including an angle measuring eyepiece, an adjustable V-shaped work holder pivotally mounted upon the base and adapted in any position of adjustment to support different size screws with their axes in a common plane extending transversely to the optical axis of the microscope, and a member secured upon the holder in coincidence with its pivotal axis and having a portion in a plane bisecting the angle of the V-shaped holder and forming means upon which to focus the microscope whereby to facilitate focusing upon the work.

GEORGE B. GALLASCH.